United States Patent [19]

Lee, Jr.

[11] 4,417,363
[45] Nov. 29, 1983

[54] METHOD OF SUPPORTING PIPE DURING MACHINING

[76] Inventor: Roy Lee, Jr., 10134 Briar Dr., Houston, Tex. 77042

[21] Appl. No.: 448,395

[22] Filed: Dec. 9, 1982

Related U.S. Application Data

[62] Division of Ser. No. 257,185, Apr. 24, 1981.

[51] Int. Cl.³ .............................................. B23G 1/22
[52] U.S. Cl. .................................. 10/107 PH; 82/2.5; 82/39
[58] Field of Search ...................... 10/87, 89 R, 107 R, 10/107 PH, 162 R; 82/2.5, 2.7, 38 R, 38 A, 39; 198/782, 809, 955; 408/1

[56] References Cited

U.S. PATENT DOCUMENTS

| | | | |
|---|---|---|---|
| 3,985,221 | 10/1976 | Lueders | 82/2.7 X |
| 4,065,989 | 1/1978 | Scheler | 82/38 A |
| 4,149,626 | 4/1979 | Holt | 198/809 X |
| 4,293,065 | 10/1981 | Dyer et al. | 198/809 X |

FOREIGN PATENT DOCUMENTS 567711 1/1933 Fed. Rep. of Germany ..... 82/38 R

Primary Examiner—Ervin M. Combs
Attorney, Agent, or Firm—Vaden, Eickenroht, Thompson, Bednar & Jamison

[57] ABSTRACT

A method of machining pipe at high speeds is disclosed that includes the steps of moving the pipe from a pipe rack onto a conveyor, moving the pipe longitudinally into the chuck of a threading machine or the like, clamping the pipe in the chuck, transferring the pipe from the conveyor to one or more steady rests, and supporting the steady rests on flexible wall air cylinders that will allow the steady rest to move as required to support the pipe which, because it is not straight, will whip and move laterally as it is rotated at the speeds required for high speed machining.

1 Claim, 13 Drawing Figures

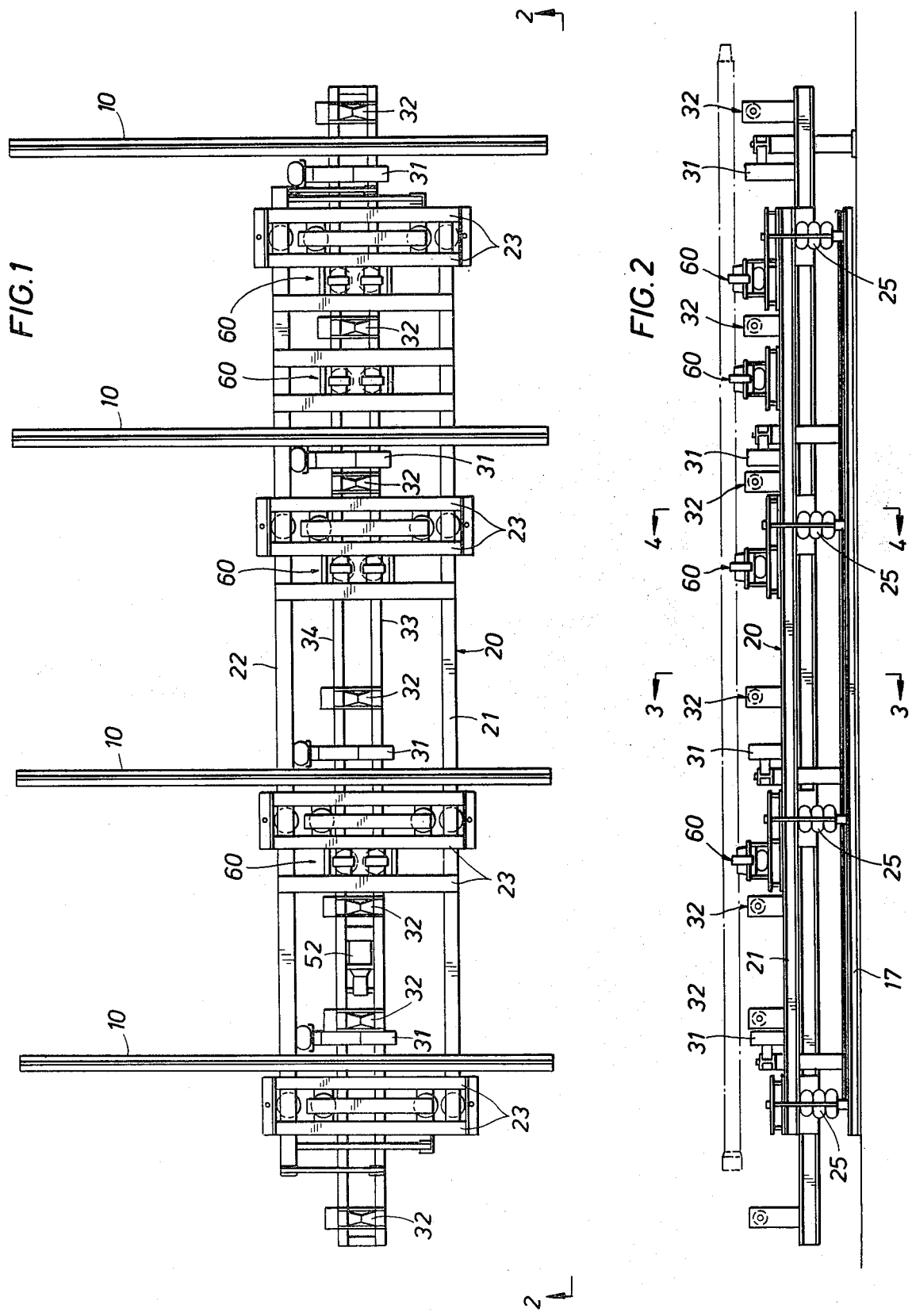

METHOD OF SUPPORTING PIPE DURING MACHINING

This application is a division of my prior application Ser. No. 257,185, filed Apr. 24, 1981, entitled "Method of Supporting Pipe for Rotation Around its Longitudinal Axis during a High Speed Operation."

This invention relates to pipe handling systems generally and in particular to a method of supporting pipe for rotation at the speeds required for present day high speed machining operations.

This invention has utility when used to support any elongated tubular member being rotated around its longitudinal axis, while a stationary cutting tool performs maching operations on the area adjacent the end of the tubular member. It is particularly useful, however, for supporting pipe while threads are machined on the end of pipe. Until recently, pipe threading machines did not operate at high surface cutting speed. The cutting tool either rotated relative to the pipe or the pipe relative to the tool, but in either event, the speed of rotation was not such as to present a problem in supporting the pipe. Now, however, with cutting speeds of 450 surface feet a minute, supporting the rotating pipe has become a problem.

No joint of pipe is perfectly straight; in fact, a lot of pipe joints are very crooked. To thread a joint of pipe, one end is moved into position in the machine tool and clamped by a chuck a foot or so from the end. The rest of the pipe, which may be from 30' to 40' long, extends outwardly from the chuck and is supported on a plurality of steady rests. If the pipe to be machined for example, is a joint of oil well casing seven inches in diameter and it is desired to thread the casing at a surface cutting speed of 450 feet per minute, the casing must be rotated at about 246 r.p.m. A crooked joint of 7" casing rotated at that speed, while being rigidly held adjacent one end, will produce large unbalanced lateral forces urging the pipe away from the axis of rotation of the chuck.

In the past, in recognition of this problem, the apparatus for supporting the rotating pipe was made as stiff and strong as possible to resist these unbalanced lateral forces. The idea was to hold the pipe against any lateral movement to the extent possible. As a result, the lateral forces and vibrations produced by the rotating crooked pipe were fed back to the threading machine, forcing it to absorb most of the shock and vibration. This caused a reduction in the quality of the machining operation, which resulted in more rejects and a decrease in the productivity of the machine.

It is an object of this invention to provide an improved method of supporting a joint of pipe for rotation at the speeds required for high speed machining operations by allowing lateral movement of the pipe and absorbing the shock and vibration created by the dynamic unbalance of a rotating crooked pipe joint thereby greatly reducing, if not eliminating, the effect of such shock loading and vibration on the machining operation.

It is another object of this invention to provide a method of supporting a joint of pipe as the pipe is being threaded or otherwise machined at high cutting speeds, such as 400-450 surface feet per minute, by mounting the steady rests that support the pipe for rotation on flexible wall air cylinders which will allow lateral movement of the steady rests due to the dynamic unbalance of the rotating pipe while exerting a resilient force resisting such movement and which will absorb, by virtue of the air cushion and flexible walls, vibrations and shock forces produced by the rotating pipe joint.

These and other objects, advantages, and features of this invention will be apparent to those skilled in the art from a consideration of this specification, including the attached drawings and appended claims.

In the drawings:

FIG. 1 is a top view of the preferred embodiment of the apparatus of this invention;

FIG. 2 is a side view of the apparatus of FIG. 1 looking in the direction of arrows 2—2 of FIG. 1;

Pipe is supplied to the apparatus used for practicing the method of this invention and moved away from the apparatus to the next work station by an inclined pipe rack consisting of spaced, parallel pipe supporting rails 10 positioned the desired distance above the floor by support posts (not shown). In the emobidment shown, four such pipe supporting rails are used. The members are inclined so that pipe loaded on the rack at the high end will roll by gravity down the rails into position to be handled by the apparatus.

Figure 7:
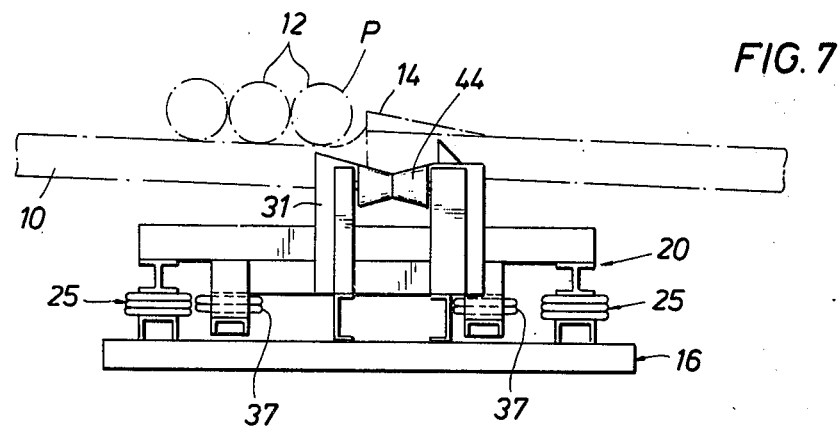
FIGS. 7 to 10 are four views of the apparatus showing the steps of moving a pipe joint from a pipe rack into position for machining.

As shown in FIG. 7, pipe joints 12 have rolled down rails 10 until the leading joint engages stop 14, which positions each successive joint to be picked up by the apparatus of this invention. After being machined, the pipe is lowered onto the inclined upper surface of stop 14 from where it rolls to the right along the rails of the pipe rack to the next work station or to storage.

The pipe handling apparatus includes base 16 made up of spaced parallel structural members 17 and 18 that are connected together by cross member 19.

Main frame 20 includes spaced, parallel structural members 21 and 22 connected together by cross members 23. The main frame is supported on base 16 by a plurality of air cylinders 25. Eight such cylinders are used in the embodiment shown with four equally spaced along each side of base 16 below members 21 and 22. Each cylinder has another aligned laterally with it on the other longitudinally extending main frame member. Above each latterally aligned pair of cylinders are two closely spaced cross members 23 of the main frame.

Each cylinder 25 comprises a molded cylindrical body 27 of elastomeric material, the ends of which are sealed by upper and lower plates 26. Metal bands 27a hold the elastomeric body in a three convolution configuration. An increase in air pressure inside body 27 will cause the end plates to move apart. A decrease in air pressure will allow the end plates to move together as the flexible convoluted side walls of body 27 collapse. The distance the two end plates can be moved apart must be limited to prevent the curved flexible side walls of the body from being straightened too much. Therefore, internally threaded sleeves 28a are connected at one end to the base by pivot pins 29. Threaded bolts 28b extend through openings in brackets 30 and engage the threads of sleeves 28a. Bracket 30 is attached to and extends between the ends of closely spaces cross members 23 extending across the main frame above the two cylinders. Rotation of bolts 28b adjusts the maximum stroke of the cylinders.

In operation, the apparatus picks up a joint of pipe from the pipe rack, conveys it longitudinally into position to be clamped by the chuck of the threading machine, supports the pipe joint while it is rotated during threading and moves it longitudinally back into position for discharge onto the pipe rack.

The pipe is picked up from the pipe rack by a plurality of pipe lifting brackets 31 and it is conveyed by a plurality of tapered roller conveyors 32. Both pipe lifting brackets and the tapered roller conveyors are mounted on two parallel channels 33 and 34, which are suspended from the main frame in the manner shown in FIGS. 3, 4, 5 and 6.

Located between and below the two cross beams 23 associated with each pair of air cylinders 25, is support beam 36. It is to the bottom of this beam, of which there are four in this embodiment, that channels 33 and 34 art attached. Each support beam rests at opposite ends of two convolution air cylinders 37. The air cylinders in turn are supported by cross members 38 which is attached to main frame cross members 23 by vertical members 39. The downward movement of channel support beam 36 relative to the main frame is limited by L-shaped stop members 40 carried by the beam, and which engage stop member 41 attached to cross member 38. Upward movement of the channels is limited by the cross beams of the main frame.

Figure 3:
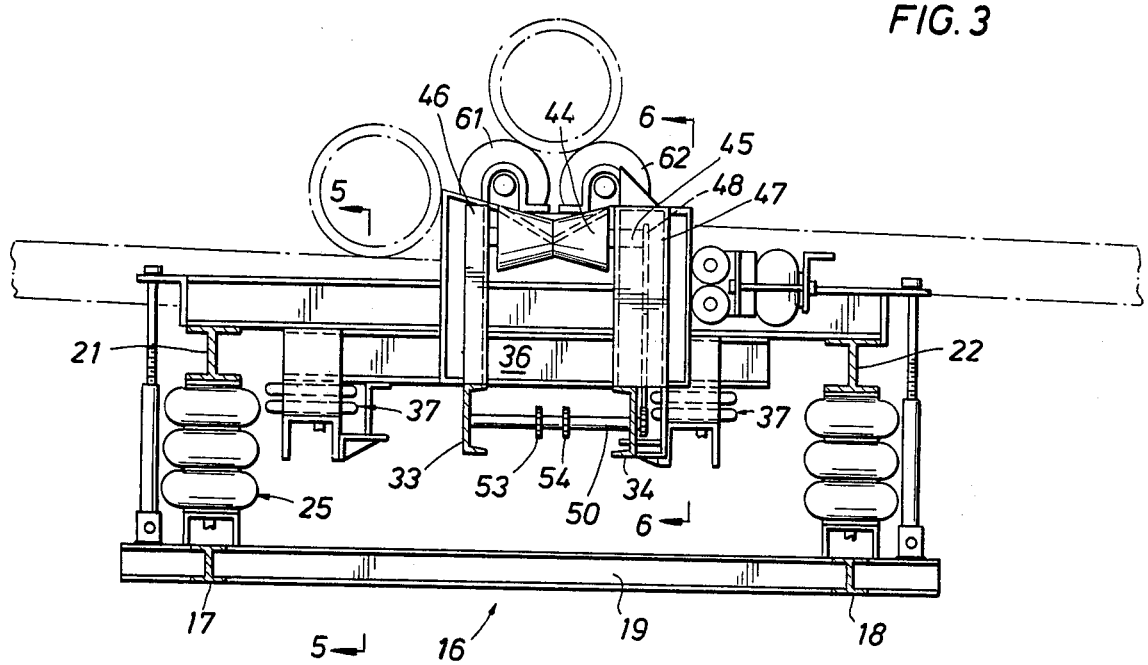
FIG. 3 is a sectional view taken along line 3—3 of FIG. 2.
Figure 4:
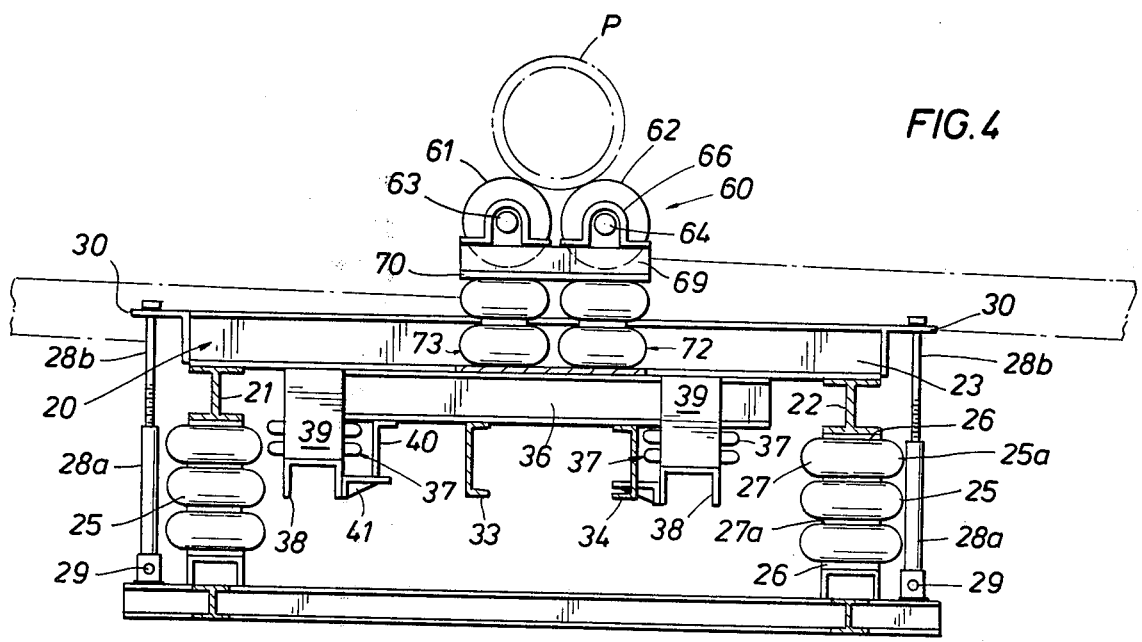
FIG. 4 is a sectional view taken along line 4—4 of FIG. 2.
Figure 5:
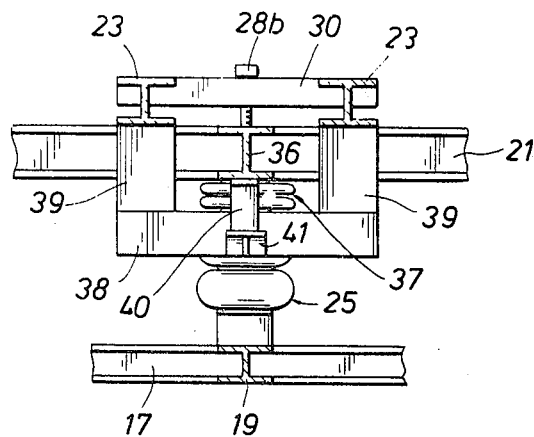
FIG. 5 is a sectional view taken along line 5—5 of FIG. 3.
Figure 6:
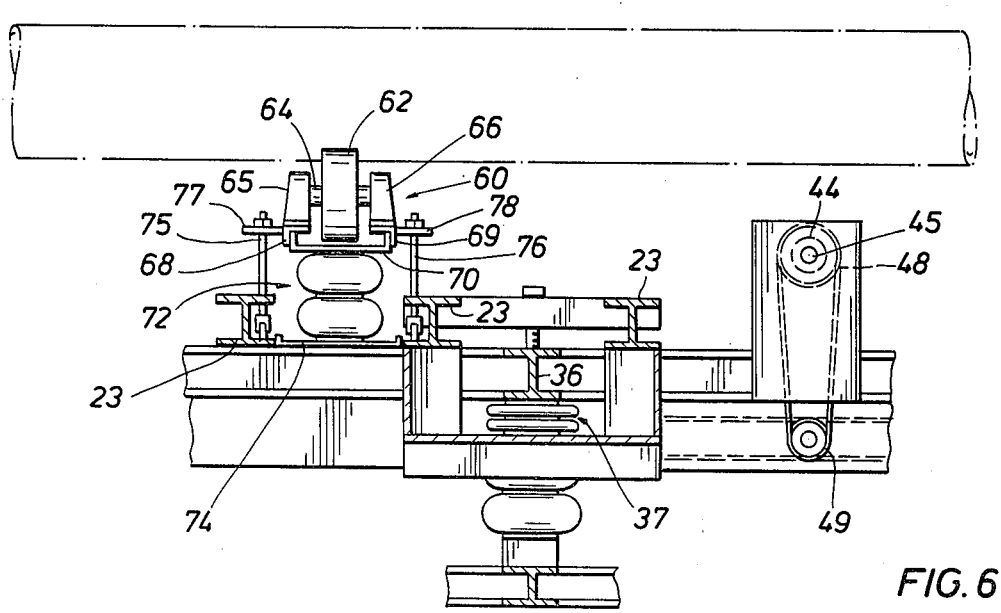
FIG. 6 is a sectional view taken along line 6—6 of FIG. 3.

In the embodiment shown, seven tapered roller assemblies 32 are spaces along channels 33 and 34. Each assembly includes tapered roller 44 mounted on shaft 45, which extends between roller support housings 46 and 47. Sprocket 48 is located on the end of shaft 45 in roller support housing 47. It is driven by a roller chain that extends between sprocket 48 and sprocket 49 located on shaft 50, which extends between channels 33 and 34, as shown in FIGS. 3 and 4. Gear motor 52, mounted between channels 33 and 34 as shown in FIG. 1, drives two sprockets 53 and 54 on shaft 50 in either one direction or the other and, in turn, rotates tapered rollers 44 to cause the pipe supported on the rollers to move longitudinally either into position to be machines or into position to be returned to the pipe rack.

Figure 13:
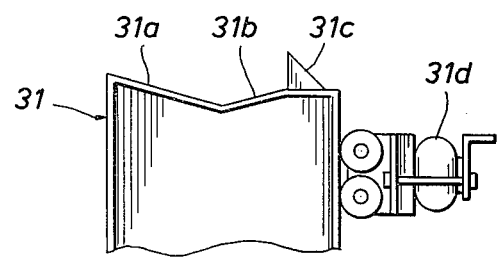
FIG. 13 is a side view of a pipe lifting bracket used to move pipe from the pipe rack to the conveyor system of the apparatus.

As stated above, pipe lifting brackets 31 are also mounted on channels 33 and 34. As best seen in FIG. 13, each bracket has a V-shaped upper surface formed by two surfaces 31a and 31b that slope downward toward the middle of the bracket. The depth of the trough formed by these surfaces is such that when the pipe rolls down surface 31a toward the bottom of the trough it will move off the bracket and onto the tapered rollers of the conveyor assemblies. Stop 31c makes sure the pipe roll up surface 31b and off the bracket. Air cylinder 31d is attached to the main frame and positioned to absorb the lateral force on the bracket from the pipe on the pipe rack moving down to replace the joint picked up by the bracket.

A plurality of steady rests 60 are mounted on the main frame to support the pipe as it is rotated during the machining operation. In the embodiment shown, four steady rests are provided. Each steady rest includes a pair of idler rollers 61 and 62 mounted for rotation around shafts 63 and 64, respectively. The rollers are positioned to support a joint of pipe, as shown in FIG. 4. Shafts 63 and 64 are supported in bearings located in bearing housings 65 and 66 on opposite sides of the rollers. The bearing housings are supported by angles 68 and 69 which extend along the flanges of channel 70. Air cylinders 72 and 73 are positioned between channel 70 and channel 74, which in turn is attached to and supported by cross beams 23 of the main frame. Threaded rods 75 and 76 extend through brackets 77 and 78 and limit the upward movement of the steady rest assembly by adjusting nuts on the upper ends of rods. The lower ends of the rods extend through openings in the flanges of beams 23 and are connected by a pin connected to the lower flanges of the beams.

Figure 8:
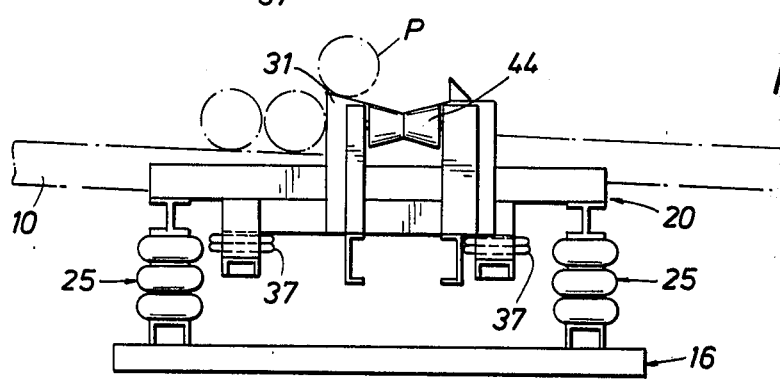
Figure 9:
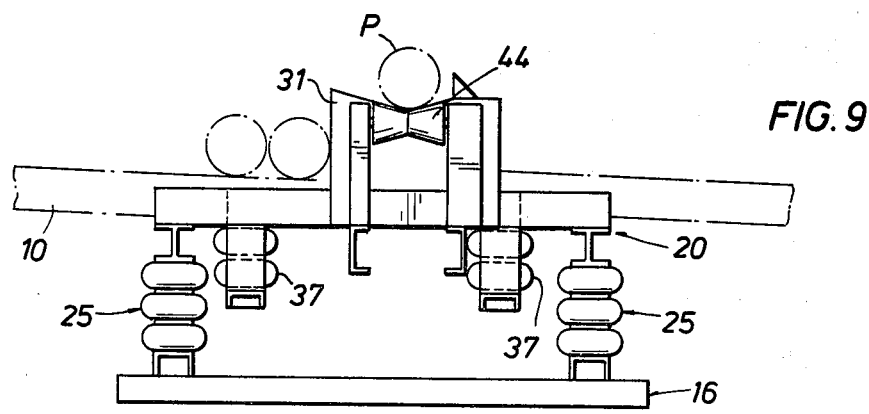

The sequence of operation of the apparatus in practicing the method of this invention is shown in FIGS. 7 through 10. In FIG. 7, all air cylinders are deflated and all portions of the apparatus are below the level of the rails of the pipe rack. In FIG. 8, air cylinders 25 have been inflated with air pressure raising main frame 20 upwardly. The upper left hand corner of pipe lifting brackets 31 lift pipe joint P upwardly from the pipe rack. The pipe rolls down the inclined surface of the brackets onto tapered rollers 44. Gear motor 52 is actuated to rotate tapered rollers 44 and move pipe P longitudinally into position in the chuck of the threading machine.

The upward stroke of cylinders 25, which move the main frame, and cylinders 72 and 73, which move the steady rests, are adjusted through bolts 28b and tie rods 75 to position the pipe in approximate alignment with the center of the chuck of the threading machines. The stroke of these cylinders must be adjusted each time the diameter of the pipe changes.

Figure 10:
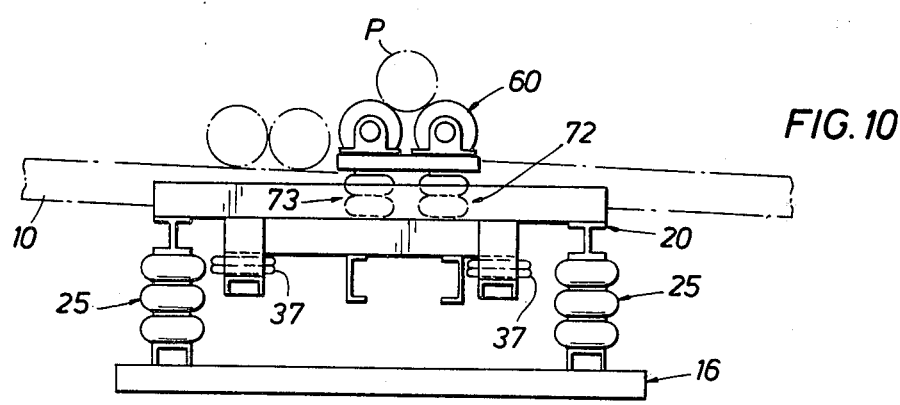

After the pipe has been clamped in the chuck, but before the machining operation begins, air cylinders 37 are deflated while air cylinders 72 and 73 are inflated. This transfers the pipe to steady rests 60, as shown in FIG. 10. The pipe can now be rotated at the speed required for the desired cutting speeds. As explained above for 7" casing, this would be about 246 r.p.m. At this speed, the pipe will tend to whip and move back and forth laterally, the extent of which will depend upon the degree of crookedness of the joint. By supporting the steady rests on air cylinders as described herein, the steady rests can move down and up and sideways as required to accommodate the lateral movement of the pipe, while continuously supporting the rotating pipe with a resilient force that will absorb the shock loads and vibrations produced by the rotating pipe.

After completion of the machining operation, all air cylinders are deflated, which lowers pipe P onto the upper inclined surface of stop 14 from which the pipe rolls along rail 10 to the right to either the next station or to storage.

Figure 11:
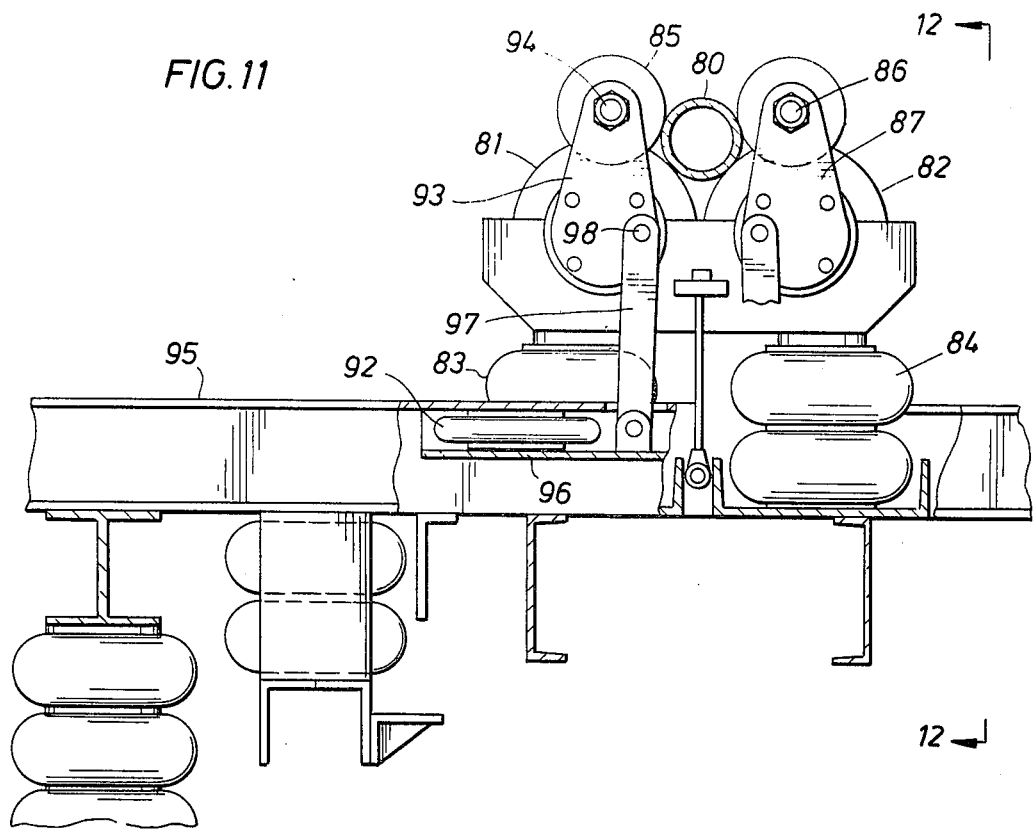
FIG. 11 is a view similar to FIG. 4 showing an alternate embodiment of the invention for supporting small diameter pipe for high speed rotation during machining operations.
Figure 12:
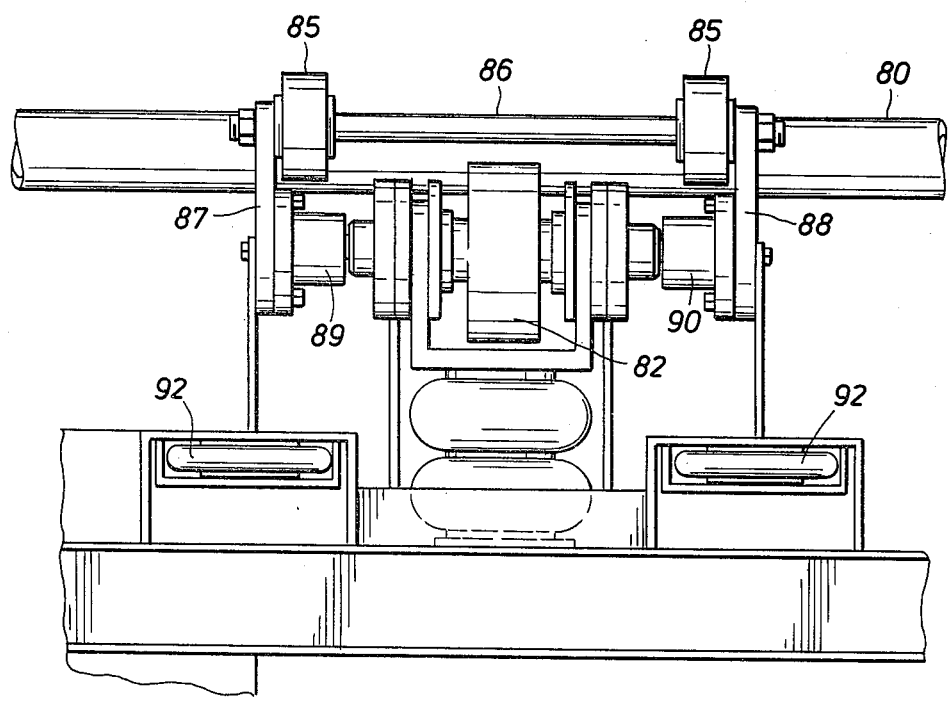
FIG. 12 is a side view of the apparatus of FIG. 9.

In FIGS. 11 and 12, an alternate embodiment of the invention is disclosed that is designed for use with small diameter pipe. Such pipe, approximately 4" in diameter and below, when rotated at the high speeds required to obtain the desired surface cutting speed, if the least bit crooked, will probably not stay in engagement with the idler rollers of the steady rests. Therefore, in this embodiment, means are provided to hold the pipe in engagement with the rollers of the steady rest.

As shown, pipe joint 80 is resting on steady rest rollers 81 and 82. Air cylinders 83 and 84 are holding the steady rest in its raised position for supporting the pipe in alignment with the chuck of the machine tool. Four hold-down wheels 85, two on each side, engage the pipe above its horizontal center line to hold the pipe on the steady rest rollers. The two hold-down wheels on the right hand side of pipe 80 is viewed in FIG. 11. They are mounted for rotation on shaft 86, which extends between crank arms 87 and 88. The crank arms are mounted for rotation around the axis of rotation of idler wheel 82 by bearings located in bearing housings 89 and 90. Links 97 each have one end pin connected to a crank arm at a point spaced from its axis of rotation, the other end of each link is pin connected to plats 96 attached to the bottom of air cylinder 92. The air cylinder has a short stroke and is shown inflated. The air cylinder exerts a downward force on the links which produces a turning moment on the crank arms, which holds the hold-down wheels in engagement with the pipe to hold the pipe on the idler wheels. When the steady rest is lowered, the links will rotate the crank arms moving the hold-down wheels away from the pipe so the pipe can be removed.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A method of machining pipe at high cutting speeds comprising the steps of moving a pipe from a pipe rack onto a conveyor, raising the conveyor to substantially align the longitudinal axis of the pipe with the center of the chuck on a machine tool, moving the pipe axially to position its end in the chuck, closing the chuck, transferring the pipe from the conveyor to a steady rest, supporting the steady rest by air pressure confined in a container having flexible side walls to allow limited lateral movement of the steady rest and the rotating pipe, rotating the pipe at the desired speed for tungsten carbide cutting tools, and machining the pipe while said pipe is being rotatably supported on said steady rest.

* * * * *